(12) United States Patent
Ji

(10) Patent No.: US 12,252,143 B2
(45) Date of Patent: Mar. 18, 2025

(54) METHOD FOR CONTROLLING CONTROLLER OF VEHICLE AND VEHICLE INTEGRATED CONTROLLER THEREFOR

(71) Applicant: HYUNDAI MOBIS Co., Ltd., Seoul (KR)

(72) Inventor: Yong Kwan Ji, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 346 days.

(21) Appl. No.: 17/741,291

(22) Filed: May 10, 2022

(65) Prior Publication Data

US 2022/0363275 A1    Nov. 17, 2022

(30) Foreign Application Priority Data

May 11, 2021 (KR) .................. 10-2021-0060650

(51) Int. Cl.
| | |
|---|---|
| *B60W 50/029* | (2012.01) |
| *B60W 40/08* | (2012.01) |
| *B60W 50/02* | (2012.01) |
| *B60W 50/14* | (2020.01) |
| *G06N 3/08* | (2023.01) |
| *H04W 4/44* | (2018.01) |

(52) U.S. Cl.
CPC .......... *B60W 50/029* (2013.01); *B60W 40/08* (2013.01); *B60W 50/0205* (2013.01); *B60W 50/14* (2013.01); *G06N 3/08* (2013.01); *H04W 4/44* (2018.02); *B60W 2040/0818* (2013.01); *B60W 2050/021* (2013.01); *B60W 2050/0215* (2013.01); *B60W 2050/143* (2013.01); *B60W 2540/229* (2020.02); *B60W 2556/65* (2020.02)

(58) Field of Classification Search
CPC ............... B60W 50/029; B60W 40/08; B60W 50/0205; B60W 50/14; B60W 2040/0818; B60W 2050/021; B60W 2050/0215; B60W 2050/143; B60W 2540/229; B60W 2556/65; B60W 2050/0002; B60W 2556/45; B60W 50/02; G06N 3/08; G06N 20/00; H04W 4/44; H04W 4/40; B60R 16/023

See application file for complete search history.

(56) References Cited

U.S. PATENT DOCUMENTS

| 11,341,847 | B1* | 5/2022 | Beaurepaire | ......... G08G 1/0133 |
| 2019/0193760 | A1* | 6/2019 | Kumar | ................ B61L 15/0058 |

(Continued)

*Primary Examiner* — Ashley L Redhead, Jr.

(74) *Attorney, Agent, or Firm* — Morgan, Lewis & Bockius LLP

(57) ABSTRACT

A vehicle integrated controller includes an in-vehicle communication module configured to communicate with at least one controller mounted on the vehicle; a collection module configured to collect collection information including controller information, which is information on the at least one controller, through the in-vehicle communication module; and an aging abnormality processor configured to calculate an aged state or an abnormal state of the at least one controller based on the collection information, and when there exists a controller (hereinafter, "control target controller") in the aged state or abnormal state among the at least one controller, calculate a value of a control parameter for the control target controller to maintain basic performance.

12 Claims, 3 Drawing Sheets

(56) References Cited

U.S. PATENT DOCUMENTS

| | | | |
|---|---|---|---|
| 2021/0129855 A1* | 5/2021 | Nakao | G05B 19/0428 |
| 2021/0221434 A1* | 7/2021 | Liu | B62D 15/025 |
| 2021/0380123 A1* | 12/2021 | Lim | B60W 50/14 |
| 2022/0219713 A1* | 7/2022 | Bai | G05B 15/02 |
| 2022/0222981 A1* | 7/2022 | Du | G07C 5/0816 |
| 2023/0169856 A1* | 6/2023 | Jung | G08G 1/048 |
| | | | 701/119 |
| 2024/0025447 A1* | 1/2024 | Wang | G08G 1/096775 |

\* cited by examiner

METHOD FOR CONTROLLING CONTROLLER OF VEHICLE AND VEHICLE INTEGRATED CONTROLLER THEREFOR

CROSS-REFERENCE TO RELATED APPLICATION

This application claims priority to and the benefit of Korean Patent Application No. 10-2021-0060650 filed on May 11, 2021, the disclosure of which is incorporated herein by reference in its entirety.

TECHNICAL FIELD

The present disclosure relates to a method for controlling a controller and a vehicle integrated controller therefor. More particularly, the present disclosure relates to a method for controlling a controller that detects aging or abnormality of a vehicle controller and performs controller control in a manner that compensates for the aging or abnormality, and a vehicle integrated controller therefor.

BACKGROUND

The contents described in this section merely provide background information for the present disclosure and does not constitute the related art.

The development of driving assist for ensuring driver safety and providing driving convenience and autonomous driving technology enabling vehicles to drive themselves on roads without driver intervention is accelerating.

A departed driver rescue and exit maneuver (DDREM) technology is an example of driving assistance technology, and is a technology that detects a situation in which a driver may not control a vehicle, controls the vehicle, and guides the vehicle to a safe driving state, thereby mitigating the risk of collision of the vehicle. For example, when a driver is drowsy driving or has a medical condition that prevents him/her from operating the vehicle on his/her own, such as a heart attack, the DDREM technology guarantees driver safety and provides driving convenience.

However, the conventional DDREM technology has a problem that only provides an alarm function to a driver when various controllers of a vehicle are aging or abnormal, but does not provide compensatory control so that a controller maintains basic performance.

SUMMARY

According to one aspect of the present disclosure, a vehicle integrated controller includes an in-vehicle communication module configured to communicate with at least one controller mounted on the vehicle; a collection module configured to collect collection information including controller information, which is information on the at least one controller, through the in-vehicle communication module; and an aging abnormality processor configured to calculate an aged state or an abnormal state of the at least one controller based on the collection information, and when there exists a controller (hereinafter, "control target controller") in the aged state or abnormal state among the at least one controller, calculate a value of a control parameter for the control target controller to maintain basic performance.

The aging abnormality processor may include: a controller state analysis module configured to calculate controller state analysis information, which is information for calculating the aged state or abnormal state of the at least one controller, from the collection information; a controller state learning module configured to learn the controller state analysis information to determine whether the at least one controller is in the aged state or abnormal state, and calculate the value of the control parameter based on the determination result; and a parameter controller configured to generate control information for controlling the control target controller based on the value of the control parameter.

The controller state analysis information may include all or a part of replacement time, use frequency, failure or not, information on a decrease in response speed or reaction speed, information on a decrease in a control speed or control amount of the at least one controller, whether a sensor in the at least one controller fails, and a calibration status.

When the controller state learning module receives the controller state analysis information to determine the aged state or abnormal state of the at least one controller, and determines that the at least one controller is in the aged state or abnormal state, the controller state learning module may select the control parameter and calculate the value of the control parameter based on a previously learned controller state learning model to output the value of the control parameter.

The parameter controller may generate the control information based on the value of the control parameter and an input value for controlling the control target controller.

The vehicle integrated controller may further include all or a part of at least one sensor mounted on the vehicle, an input/output, and a V2X communication module communicating with other vehicles or infrastructure.

The collection module may further collect all or part of driver information, navigation information, road information, and other vehicle information from the at least one controller, the at least one sensor, and the V2X communication module as the collection information.

The driver information may include information on driver's attention, and the aging abnormality processor may generate control information for controlling the control target controller based on the value of the control parameter, and transmit the control information to the control target controller in preference to other data packets when it is determined that the driver's attention is reduced based on the information on the driver's attention.

The parameter controller may further generate alarm information for notifying a driver or passenger of the vehicle of the determination result based on the determination result.

The parameter controller may further generate assistance information for notifying infrastructure adjacent to the vehicle or other vehicles of the state of the vehicle based on the determination result and/or the value of the control parameter.

The vehicle integrated controller may further include a V2X communication module configured to transmit the assistance information to the other vehicles or the infrastructure on a route on which the vehicle drives.

According to one aspect of the present disclosure, a method of controlling a vehicle integrated controller may include collecting controller information, which is information on at least one controller, as collection information from the at least one controller mounted on a vehicle; and calculating an aged state or an abnormal state of the at least one controller based on the collection information, and when there exists a controller in the aged state or abnormal state among the at least one controller, calculating a value of a control parameter for the control target controller to maintain basic performance.

The calculating of the value of the control parameter may include calculating controller state analysis information, which is information for calculating the aged state or abnormal state of the at least one controller, from the collection information; and determining whether the at least one controller is in the aged state or abnormal state based on the controller state analysis information, and calculating a value of a control parameter for maintaining a preset basic performance of the control target controller based on the determination result.

The calculating of the value of the control parameter may further include generating control information for controlling the control target controller based on the value of the control parameter.

The calculating of the value of the control parameter may include receiving the controller state analysis information to determine the aged state or abnormal state of the at least one controller based on a controller state learning model generated based on a hyperparameter for maintaining the basic performance of the control target controller, selecting the control parameter when it is determined that the at least one controller is in the aged state or abnormal state, and calculating the value of the control parameter.

DETAILED DESCRIPTION

Accordingly, a main object of the present disclosure is to calculate an aged state or an abnormal state of a controller mounted on a vehicle, calculate a value of a control parameter to maintain basic performance of the controller in an aged state or an abnormal state, and perform compensatory control on the controller so that basic performance is maintained even if there is the aging or abnormality in the controller.

The objects of the present disclosure are not limited to the objects described above and other objects will be clearly understood by those skilled in the art from the following description.

Figure 1:
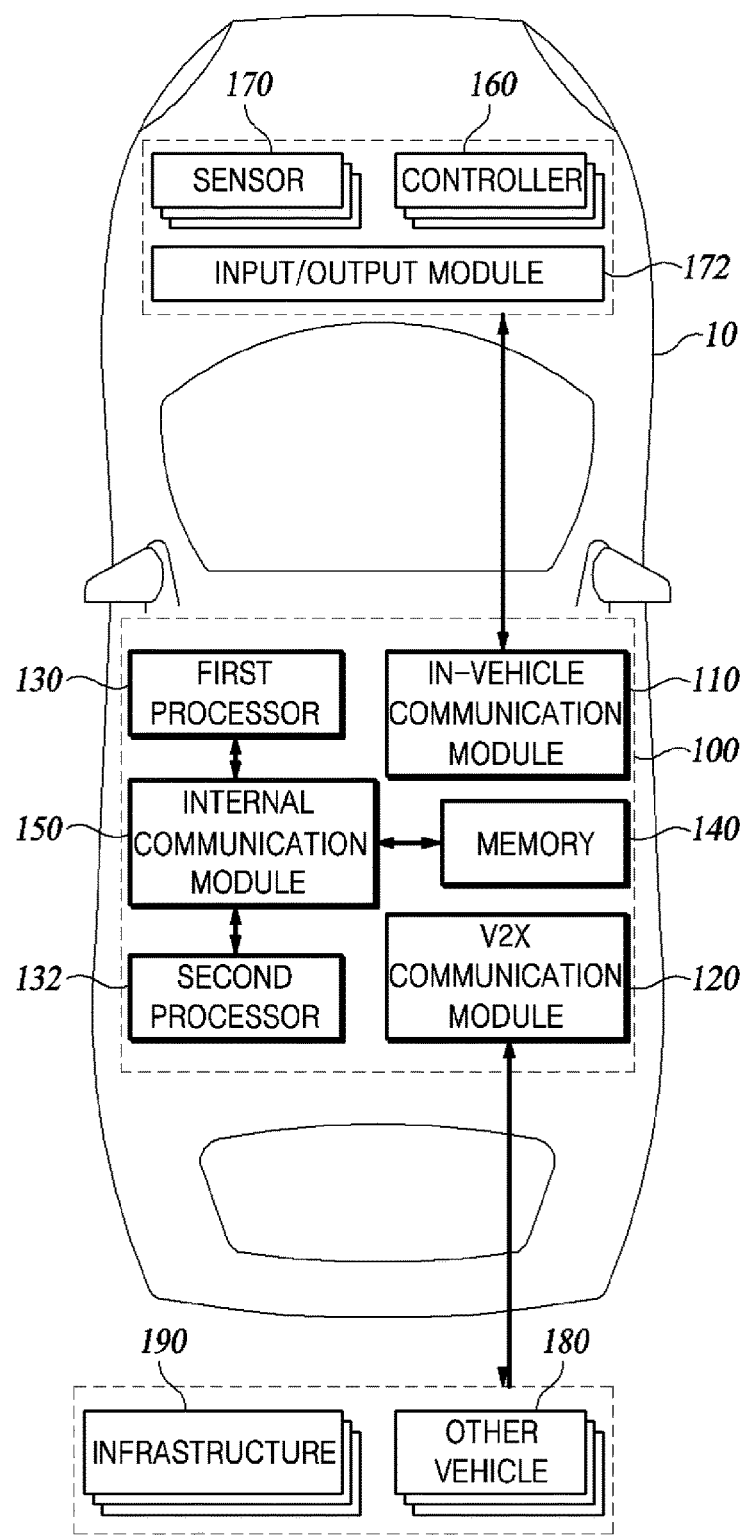
FIG. 1 is a block diagram schematically illustrating a vehicle integrated controller according to an embodiment of the present disclosure.

FIG. 1 is a block diagram schematically illustrating a vehicle integrated controller according to an embodiment of the present disclosure.

An integrated controller 100 according to an embodiment of the present disclosure is mounted on a vehicle 10 such as passenger car, taxi, van, bus, or truck, and receives data from various devices inside/outside the vehicle 10 and stores, processes, and/or analyzes the received data to control overall driving of the vehicle 10.

The integrated controller 100 electrically may control various driving devices (not illustrated) in the vehicle by interworking with at least one controller 160 mounted on the vehicle, or directly control various driving devices in the vehicle independently of the controller 160.

Referring to FIG. 1, the integrated controller 100 according to an embodiment of the present disclosure includes all or part of an in-vehicle communication module 110, a V2X communication module 120, at least one processor 130 and 132, a memory 140, and an internal communication module 150. Not all blocks shown in FIG. 1 are essential components, and in other embodiments, some blocks included in the integrated controller 100 may be added, changed, or deleted.

The in-vehicle communication module 110 is configured to communicate with at least one controller 160, at least one sensor 170, and/or an input/output module 172 mounted on the vehicle.

The in-vehicle communication module 110 may transmit/receive data to and from the controller 160, the at least one sensor 170, and/or the input/output module 172 using various communication protocols existing in the vehicle. The communication protocol may include at least one of a controller area network (CAN), a CAN with flexible data rate (CAN FD), Ethernet, a local interconnect network (LIN), and FlexRay, but is limited thereto, and any protocol for communication between various devices mounted on the vehicle may be applied.

The controller 160 may collect information related to each vehicle controller, such as a vehicle driving controller and an advanced driver assistance systems controller (ADAS), as controller information. Here, the vehicle driving controller may include, but is not limited to, an engine management system (EMS), electronic stability control (ESC)/electronic stability program (ESP)/vehicle dynamic control system (VDC), and the like. The ADAS controller may include, but is not limited to, lane keeping assist system (LKAS), highway driving assist (HDA), smart cruise control (SCC)/advanced cruise control (ACC), autonomous emergency braking (AEB)/forward collision-avoidance assist (FCA), highway driving pilot (HDP), lane departure warning (LDW), driver attention warning (DAW), driver system warning (DSW), etc. The controller 160 may include one or more of other devices for electrically controlling various driving devices in the vehicle.

The sensor 170 may include, but is not limited to, a radar, a lidar, an ultrasonic sensor, a camera, a wheel speed sensor, an accelerator level detection sensor, a steering angle sensor, a yaw rate sensor, a global positioning system (GPS) receiver, and a gyroscope sensor, and may include all sensors applicable to a vehicle.

The input/output module 172 is mounted on the vehicle 10 and receives an input (e.g., a touch input, a voice input, a button input, a text input, etc.) from a driver/passenger and transmits the input data to the controller 160 and/or the in-vehicle communication module 110. The input/output module 172 receives alarm information from the sensor 170, the controller 160, and/or the in-vehicle communication module 110 and outputs an alarm (message output, sound output, etc.).

The input/output module 172 may employ a display unit, a microphone unit, a speaker unit, an indoor camera, a biometric identifier, a grip sensing unit that detects whether a driver grips the steering wheel of the vehicle 10, or the like, but is not limited thereto.

When the input/output module 172 is the display unit, the input/output module 172 may receive a driving mode input from a driver/passenger to the display unit, question and personal information of the driver/passenger, vehicle driving information (e.g., autonomous driving mode/manual driving mode, or sports mode/eco mode/safe mode/normal mode, etc.), health status information, etc., and transmit the received information to the in-vehicle communication module 110. When the input/output module 172 is the microphone unit, the input/output module 172 may receive a voice from the driver/passenger may be received and transmit the received voice to the in-vehicle communication module 110. In another embodiment, the input/output module 172 may receive the driver's biometric information, communication information, health status information, etc., by interworking with a wearable device mounted on a driver or a driver's terminal.

The V2X communication module 120 is configured to communicate with an external device of a vehicle. According to embodiments, the V2X communication module 120 may communicate with another vehicle 180 (vehicle to vehicle (V2V)) or communicate with infrastructure 190 (vehicle to infrastructure). The infrastructure 190 may be, for example, a roadside base station that periodically transmits traffic information by interworking with a transportation information system (TIS) or an intelligent transport system (ITS), but is not limited to these examples, and may include all infrastructures that may communicate with the vehicle 10.

The V2X communication module 120 may transmit/receive data to and from the outside of the vehicle, preferably using a wireless communication protocol. To this end, the V2X communication module 120 may include at least one of a transmit antenna, a receive antenna, a radio frequency (RF) circuit capable of implementing various communication protocols, and an RF element.

According to embodiments, the overall operation of the in-vehicle communication module 110 and the V2X communication module 120 may be controlled by a separate processor (not illustrated) provided therein. The in-vehicle communication module 110 and the V2X communication module 120 may or may not include one or more processors. When the in-vehicle communication module 110 and the V2X communication module 120 does not include a processor, the in-vehicle communication module 110 and the V2X communication module 120 may be operated under the control of at least one processor 130 and 132 in the integrated controller 100.

The processors 130 and 132 may control the overall operation of the vehicle 10. According to embodiments, each of the processors 130 and 132 may be implemented as an electronic controller unit (ECU), a micro controller unit (MCU), an application processor (AP), and/or other electronic devices capable of performing various arithmetic processing and generating control signals.

At least one of the processors 130 and 132 may perform a determination related to the control of the vehicle 10, and control another controller 160 and/or a driving device (not illustrated) according to the determination result. According to embodiments, at least one of the processor 130 and 132 may generate a control command for controlling the controller 160 and/or a driving device (not illustrated) based on the data received by the in-vehicle communication module 110 and/or the V2X communication module 120.

At least one of the processors 130 and 132 may provide a gateway function for supporting communication between the controller 160 and/or the sensors 170 for transmitting and receiving data using different protocols and different data buses.

At least one of the processors 130 and 132 may control navigation and may generate, update, or terminate a navigation map.

At least one of the processors 130 and 132 may confirm/determine or learn the state of various controllers (not illustrated) of the vehicle 10 or control parameters controllable by various controllers (not illustrated).

The memory 140 stores various programs and data necessary for driving the vehicle 10. The memory 140 may store data input/output to and from at least one of the processors 130 and 132. The memory 140 may store data processed by at least one of the processors 130 and 132. The memory 140 may store various data for the overall operation of the vehicle 10, such as a program for processing or controlling the at least one processor 130 and 132.

The memory 140 may store various data necessary for autonomous driving and/or driving assistance of a vehicle, or data generated in the process of providing autonomous driving and/or driving assistance functions of the vehicle by the processors 130 and 132.

Map information required for autonomous driving and/or driving assistance control by the processors 130 and 132 may be stored in the memory 140. The memory 140 is the map information, and may save a navigation map providing road unit information and/or a precision road map providing lane unit road information, that is, a three-dimensional high definition (HD) map. The map information stored in the memory 140 may provide dynamic and static information required for autonomous driving and/or driving assistance of the vehicle 10 such as lanes, lane center lines, regulatory lines, road boundaries, road center lines, traffic signs, road surface signs, shape and height of roads, and lane widths.

An algorithm for autonomous driving and/or driving assistance control of a vehicle may be stored in the memory 140. The processors 130 and 132 may execute an algorithm stored in the memory 140 to perform the active autonomous driving and/or driving assistance control in the surrounding environment of the vehicle.

When the internal communication module 150 does not accurately recognize the malfunctioning processors 130 and 132, the internal communication module 150 is introduced to prevent the failure propagation problem in which the normal processors 130 and 132 are affected, and improve the communication speed between the processors 130 and 132 or between the processors 130 and 132 and the memory 140.

According to an embodiment of the present disclosure, the internal communication module 150 may include a direct memory access controller (DMA) (not illustrated) that directly accesses the memory 140 or the local memory (not illustrated) of the processors 130 and 132 on behalf of the respective processors 130 and 132.

The internal communication module 150 performs data transmission between the processors 130 and 132 or between the processors 130 and 132 and the memory 140. Accordingly, the processors 130 and 132 may process calculation and data transmission in parallel. For example, the internal communication module 150 may access the memory 140 instead of the processors 130 and 132 to perform read/write operations. Accordingly, the processors 130 and 132 may perform other arithmetic processing while the read/write operation is being performed, and receive a completion interrupt from the internal communication module 150 when the operation is completed. On the other hand, when the processors 130 and 132 do not receive the completion interrupt, the processors 130 and 132 may determine that the memory 140 has failed.

In this way, when the DMA controller is used, it is possible to implement a faster communication speed compared to the existing CAN communication method, and recognize a failure based on whether the interrupt is received.

According to embodiments, the processors 130 and 132 may recognize whether messages from the other processors 130 and 132 are normally received and/or whether there is a failure based on whether an ACK is received.

For example, when the first processor 130 wants to transmit a message to the second processor 132, the first processor 130 or the internal communication module 150 issues an interrupt to the second processor 132 and the second processor 132 recognizing the interrupt confirms the message. The second processor 132 confirming the message transmits an ACK indicating that the message has been normally received. The second processor 132 or the internal communication module 150 interrupts the first processor 130, and the first processor 130 receiving the ACK recognizes that the second processor has normally received the message.

Meanwhile, when the second processor 132 does not transmit the ACK, the first processor and/or the internal communication module 150 may retransmit the message, or may determine immediately that the second processor 132 has failed.

Figure 2:
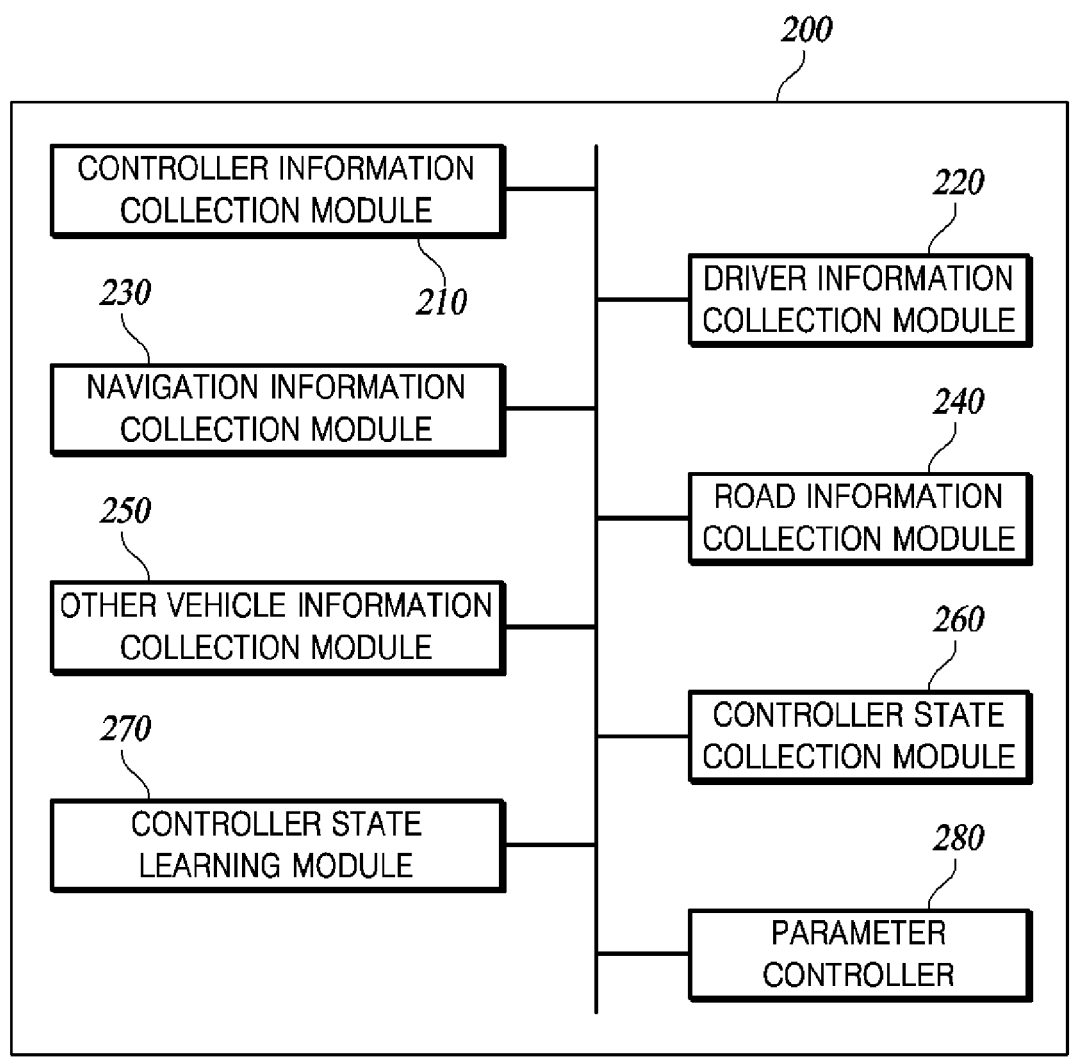
FIG. 2 is a block configuration diagram schematically illustrating an aging abnormality processor according to an embodiment of the present disclosure.

FIG. 2 is a block configuration diagram schematically illustrating an aging abnormality processor according to an embodiment of the present disclosure.

Referring to FIG. 2, the aging abnormality processor 200 according to an embodiment of the present disclosure includes all or a part of a controller information collection module 210, a driver information collection module 220, a navigation information collection module 230, a road information collection module 240, the other vehicle information collection module 250, a controller state analysis module 260, a controller state learning module 270, and a parameter controller 280. Not all blocks illustrated in FIG. 2 are essential components, and in other embodiments, some blocks included in the aging abnormality processor 200 may be added, changed, or deleted.

A function (operation) of the aging abnormality processor 200 according to an embodiment of the present disclosure may be distributed and performed by the plurality of processors 130 and 132. For example, the function of the controller information collection module 210 may be performed by the first processor 130, and the function of the road information collection module 240 may be performed by the second processor 132.

Hereinafter, for convenience of description, it will be described that functions of all components included in the aging abnormality processor 200 are performed by one of the processors 130 and 132. For example, the function of the aging abnormality processor 200 may be performed by the first processor 130. In this case, the aging abnormality processor 200 may be a sub-component of the first processor 130.

Meanwhile, in the present embodiment, the controller information collection module 210, the driver information collection module 220, the navigation information collection module 230, the road information collection module 240, and the other vehicle information collection module 250 may be collectively referred to as the collection unit (not illustrated).

The controller information collection module 210 collects information that the in-vehicle communication module 110 receives from at least one controller 160.

The controller information collection module 210 may collect vehicle controller-related information (hereinafter, 'controller information') among the information received by the in-vehicle communication module 110 from the at least one controller 160. The controller information may include, for example, all or a part of information on the values of the control parameters of each controller 160, information (e.g., replacement time, etc.) on the aged state of each controller 160, and information on the abnormal state, but is not limited thereto, and when the information generated/collected/detected by the controller 160 is obtained, any information may be the controller information in the present disclosure.

The information on the value of the control parameter may be received by the communication module 110 in the vehicle 10 from at least one sensor 170 or may include one or more of values related to a vehicle speed, whether slip occurs, a yaw rate, a turning state, a turning radius, a sideslip angle, an uphill state, etc., but is not limited thereto.

The driver information collection module 220 may collect driver information by using the in-vehicle input/output module 172, the communication module 110, the V2X communication module 120, and/or the memory 140. The driver information is the information on the driver of the vehicle 10, and may include all or a part of driver identification information, information (e.g., fatigue, underlying disease, visual acuity, etc.) on a driver's health status, driver's careless state information, driver's face recognition information, driver's gaze information, and driver's driving time/mileage information, but is not limited thereto.

The navigation information collection module 230 collects the navigation information of the vehicle 10 using the in-vehicle communication module 110, the V2X communication module 120, and/or the memory 140. The navigation information may include location information of the vehicle 10, map information corresponding to the location information, route information, and condition information (curvature, slope, lane, etc., of a road) of a road on which the vehicle 10 is driving.

The navigation information collection module 230 may use the in-vehicle communication module 110 to collect destination information that a driver/passenger inputs to the navigation device and/or input/output module 172 mounted on the vehicle 10 and route information according to destination setting (the shortest route selected by the driver/passenger, a preferred route, or the like among candidate routes to the destination).

The navigation information collection module 230 may extract map information corresponding to a current location from among the map information pre-stored in the memory 140 based on the current location of the vehicle positioned by the GPS receiver or use the V2X communication module 120 to extract the map information corresponding to the current location from the external server.

The navigation information collection module 230 may extract condition information of a road from the map information corresponding to the current location of the vehicle 10, or may directly calculate the condition information of the road based on the data of the sensor 170.

The road information collection module 240 collects environmental information on the external environment of the vehicle 10, and preferably, road infrastructure information (hereinafter, "road information"). The road information collection module 240 may collect road information received by the V2X communication module 120 from the infrastructure 190. The road information collection module 240 may collect all information related to the external environment of the vehicle, particularly a road on which the vehicle 10 drives, such as a type of road (e.g., highway, local national roads, city road, etc.), a condition of a road surface, infrastructure around a road (e.g., rest area, drowsiness shelter, gas station, electric vehicle charging station, etc.), and traffic flow (e.g., smooth, slow, delayed, congested, etc.)

Such road information may be information generated based on the other vehicle information and road information collected by the other vehicle information collection module 250. For example, the road information collection module 240 may analyze the traffic flow as one of smooth, slow, delayed, and congested based on the speed of the other vehicle 180, the number of vehicles on the road on which the vehicle is driving, and the like.

On the other hand, the information used for analyzing the traffic flow of the road is not limited to the above description. For example, the road information collection module 240 may analyze the traffic flow of the road on which the vehicle is driving by further considering the location (or relative position) of the other vehicle 180 collected by the other vehicle information collection module 250, the traffic flow information collected by itself, and the condition information of the road collected by the navigation information collection module 230, etc.

The other vehicle information collection module 250 collects state information (hereinafter, "other vehicle information") of the other vehicle 180 that the in-vehicle communication module 110 and/or the V2X communication module 120 receives.

The other vehicle information collection module 250 may collect the other vehicle information received by the in-vehicle communication module 110 from at least one sensor 170. For example, the other vehicle information collection module 250 may use the in-vehicle communication module 110 to collect all information about the other vehicle 180 that may be calculated with sensor data, such as whether the other vehicle 180 is detected for at least one of the front, left, right, and rear of the vehicle, and the other vehicle 180 and the relative position and relative speed of the other vehicle 180.

The sensor 170 used for collecting the other vehicle information may include one or more of a radar, a lidar, an ultrasonic sensor, and a camera disposed on at least one of the front, left, right, and rear of the vehicle, but the type, the arrangement position, and the number of arrangements of sensors are not limited to a specific embodiment.

According to embodiments, the other vehicle information collection module 250 may directly calculate the other vehicle information based on data received by the in-vehicle communication module 110 from the sensor 170. For example, the other vehicle information collection module 250 may analyze the time when the signal transmitted by the sensor 170 is reflected back by the other vehicle 180 or the strength of the signal transmitted and received by the sensor 170 or apply the predefined image processing to the image captured by the sensor 170 to determine the relative position, relative speed, or the like of the other vehicle 180. Furthermore, the other vehicle information collection module 250 may calculate spatial information when changing lanes based on the relative position, relative speed, or the like of the other vehicle 180.

The other vehicle information collection module 250 may collect the other vehicle information received by the V2X communication module 120 from the other vehicle 180. For example, the other vehicle information collection module 250 may collect all information related to the other vehicle 180, such as the vehicle type, speed, location, driving route, and heading angle of the other vehicle 180.

The controller state analysis module 260 confirms the state of each controller 160 based on all or part of the information collected by each collection module 210 to 250, preferably the aged state and/or abnormal state of each controller 160.

The controller state analysis module 260 may determine the aged state of the controller 160 by confirming a replacement time, a frequency of use, etc., of each controller 160 based on all or part of the information collected by each collection module 210 to 250. This aged state may be calculated according to a mapping table or algorithm set based on the replacement time, the frequency of use, and/or a value or category of performance. In another embodiment, the controller state analysis module 260 may calculate the aging value based on all or part of the information collected by each collection module 210 to 250, and calculate the result of categorizing the aging value as the aged state.

On the other hand, when a "break-in" operation has to be performed for a certain period/a certain number of times after the replacement, such as a brake pad, it may not be determined that the degree of aging of the controller is high due to the frequency of simple use. Accordingly, the controller state analysis module 260 may determine the aged state of each controller 160 based on the information collected after the preset number of times of control is performed from the replacement time of each controller 160 or after the preset period has elapsed. For example, in the case of an FCA system that automatically brakes a vehicle when the risk of a collision increases, if the break-in of the brake pad used for braking is not completed, a burnish layer is not sufficiently generated and thus an appropriate braking force may not occur. Therefore, it is preferable that the determination on the aged state of the FCA system is performed based on data collected after satisfying specific conditions based on the number of braking times of the vehicle, the degree of formation of the burnish layer, and/or whether the break-in mode is performed.

The controller state analysis module 260 may calculate and record control performance based on all control information related to a specific controller among the information collected from the collection modules 210 to 250, and recalculate the control performance periodically or irregularly to calculate the aged state based on the degree of deterioration in performance compared to the conventionally calculated control performance or the rate at which the performance deteriorates.

The controller state analysis module 260 may determine whether a sensor (not illustrated) in the controller 160 has a failure, a calibration status, etc., based on all or part of the information collected by each collection module 210 to 250 to calculate the abnormal state of the controller 160. Alternatively, the abnormal state may be calculated by determining the failure of the controller 160, the decrease in response speed or reaction speed, the decrease in control speed or control amount, etc., but is not limited thereto.

The controller state learning module 270 performs training to output the aged state and/or the abnormal state of the controller 160 based on all or part of the information confirmed, calculated, or determined by the controller state analysis module 260. Specifically, the controller state learning module 270 learns each controller state learning model to determine the aged state and/or abnormal state by using all or part of the replacement timing, the frequency of use, the failure, the decrease in response speed or reaction speed, the decrease in control speed or control amount of each controller 160, the failure of the sensor in the controller 160, or the calibration status (hereinafter, "controller state analysis information") as a feature The training may be performed by generating a dataset by labeling the controller state analysis information as the aged state and/or abnormal state calculated by the controller state analysis module 260, and extracting a training dataset and/test dataset.

The controller state learning module 270 may divide the aged state or abnormal state by category to separately train the controller state learning model.

The controller state learning module 270 transmits, to the parameter controller 280, the aged state and/or abnormal state of the controller 160 output by the pre-trained controller state learning model based on the controller state analysis information.

The controller state learning model may receive the controller state analysis information and output a value of a control parameter for the purpose of maintaining the basic performance of each controller 160. In this case, the controller state learning model may be a model generated by using a hyperparameter for maintaining the basic performance of each controller 160 as an input parameter. Here, the hyperparameter of the controller state learning model may be a value received by the in-vehicle communication module 110 from the input/output module 172, the sensor 170, etc., a value received by the V2X communication module 120 from the infrastructure 190, or the other vehicle 180, or a value pre-stored in the memory 140.

The controller state learning model may intermediately output the aged state and/or abnormal state of each controller 160 from the controller state analysis information, and finally output a value of a control parameter that enables each controller 160 to maintain basic performance according to the output aged state and/or the degree of the abnormal state. The output of the value of the control parameter may be a value obtained by finally outputting the value of the control parameter for controlling the corresponding controller after first selecting the control parameter for maintaining the basic performance of the aged or abnormal controller based on the aged state and/or abnormal state of each controller 160.

The controller state learning model may be a learning model based on deep learning. The controller state learning model may be trained in a manner such as supervised learning, unsupervised learning, semi-supervised learning, self-supervised learning, and/or reinforcement learning. Since a specific method for the controller state learning module 270 to train the controller state learning model is general in the relevant field, a detailed description thereof will be omitted.

The controller state learning module 270 may store the trained model and/or the value of the finally output control parameter in the memory 140.

The controller state learning module 270 according to another embodiment of the present disclosure may train, to the controller state learning model, a selection criterion for which parameter should be used as a feature in order to train the aged state and/or the abnormal state of each controller 160. In this case, the controller state learning model may output a feature map that outputs a specific parameter from the controller state analysis information, and finally output the aged state and/or abnormal state of the controller 160 using the output feature map.

Meanwhile, in FIG. 2, the controller state learning module 270 is illustrated as a component of the aging abnormality processor 200, but the controller state learning module 270 may be implemented as a separate independent type that may be linked with the aging abnormality processor 200. In this case, the controller state learning module 270 and the aging abnormality processor 200 may perform wired/wireless communication to provide the model information built by the controller state learning module 270 to the aging abnormality processor 200, and may provide various types of information collected by the aging abnormality processor 200 to the parameter controller 280 as training data.

The parameter controller 280 generates control information for controlling each controller 160 based on the value of the control parameter output by the controller state learning module 270 of the vehicle 10 and/or the input value for controlling each controller 160 (e.g., parameter value or the like other than the control parameter). The parameter controller 280 transmits the generated control information to the controller 160 corresponding to the control information through the in-vehicle communication module 110.

The parameter controller 280 may generate control information by further considering all or part of driver information, road information, navigation information, and the other vehicle information, or determine the transmission speed or transmission order of control information. For example, when the driver's attention as the driver information decreases, in order to control the controller 160 more quickly, only specific control information may be first generated or first transmitted to the controller 160. Here, the preferential transmission method may be a method in which, when the in-vehicle communication module 110 transmits a data packet to the controller 160, the specific control information is transmitted prior to other data packets. In addition, the rapid control of the controller 160 may be performed by implementing the controller 160 to preferentially process control information including an emergency tag among control information using the parameter controller 280 as a source. As another example, when the traffic flow is bad as road information or when there is another vehicle 180 adjacent to the vehicle 10, if the controller 160 is directly controlled according to the control information, there is a risk of a traffic accident. Therefore, the parameter controller 280 may generate control information, lower a transmission speed of control information, or delay a transmission order by adding specific conditions (e.g., control timing, control amount change speed, etc.) so that each controller 160 is controlled when the traffic flow is out of a bad state or when the adjacent other vehicle 180 does not exist.

The parameter controller 280 may acquire a driving pattern corresponding to the environmental information by applying the environmental information to the training result of the controller state learning module 270. For example, the control information generation module 290 may acquire the driving pattern corresponding to the environmental information by using the environmental information as input data of a pre-trained model.

The parameter controller 280 generates alarm information for notifying the driver/passenger of the corresponding state based on the aged state and/or the abnormal state of the controller 160 output by the controller state learning module 270. Such alarm information may include an alarm message for displaying on the input/output module 172, a warning signal for outputting sound, and the like.

The parameter controller 280 transmits assistance information, which is information for notifying the state of the vehicle 10, to the vehicle 10 manufacturer's service center, the infrastructure 190 adjacent to the vehicle 10 or the other vehicle 180 adjacent to the vehicle 10 through the V2X communication module 120, based on the value of the aged state, the abnormal state, and/or the value of the control parameter of the controller 160 output by the controller state learning module 270. It is apparent that the assistance information may be transmitted to the infrastructure 190 or the other vehicle 180 on the route on which the vehicle 10 drives on the basis of the navigation information of the vehicle 10 by the V2X communication module 120, and may be transmitted to the other vehicle 180 adjacent to the vehicle 10 or the infrastructure 190. In this way, even if the driver/passenger does not describe the state of the vehicle 10, the technician of the service center, the infrastructure, or the other vehicle may take an action suitable for the state of the vehicle 10.

Figure 3:
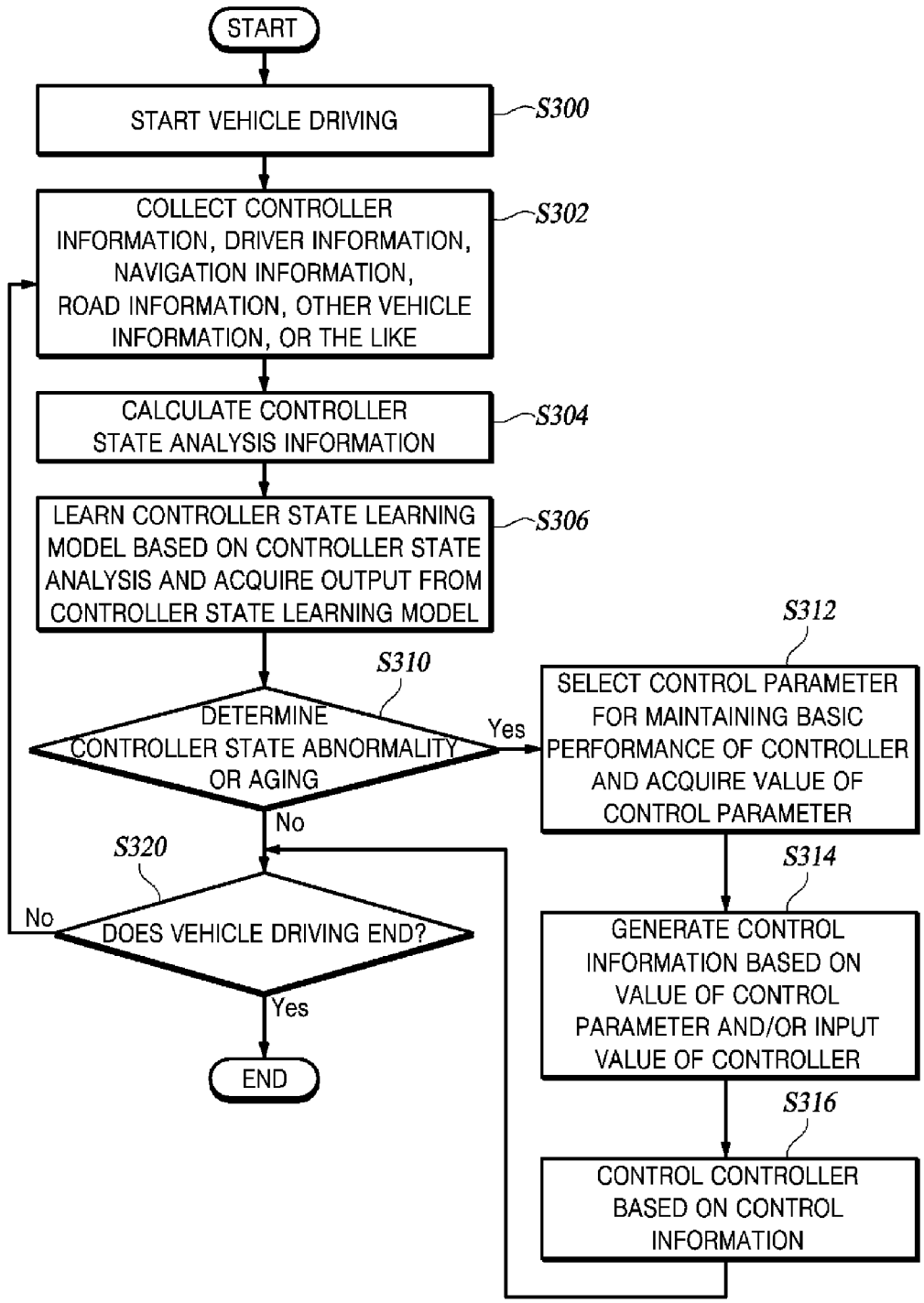
FIG. 3 is a flow chart illustrating a method for controlling a vehicle controller according to an embodiment of the present disclosure.

FIG. 3 is a flow chart illustrating a method for controlling a vehicle controller according to an embodiment of the present disclosure.

The vehicle 10 starts driving (S300).

The integrated controller 100 collects all or part of the controller information, the driver information, the navigation information, the road information, and the other vehicle information as the information received from at least one controller 160 mounted on the vehicle 10, at least one sensor 170, the input/output module 172, the other vehicle 180, and the infrastructure 190 or by using the received information (S302).

The integrated controller 100 calculates the controller state analysis information based on all or part of the controller information, the driver information, the navigation information, the road information, and the other vehicle information (S304). The controller state analysis information may include all or a part of the replacement timing, the frequency of use, the failure, the decrease in response speed or reaction speed, the decrease in control speed or control amount of each controller 160, the failure of a sensor in the controller 160, and the calibration status as the information indicating the aged state and/or abnormal state of each controller 160.

The integrated controller 100 learns the controller state learning model based on the controller state analysis information, or acquires an output from the controller state learning model (S306). In this case, the controller state learning model may be a model generated by using the hyperparameter for maintaining the basic performance of each controller 160 as an input parameter. The controller state learning model may output the aged state and/or abnormal state of each controller 160 based on the controller state analysis information, or may output the value of the control parameter for each controller 160 to maintain the basic performance. Alternatively, the controller state learning model may select the control parameter for maintaining the basic performance of the corresponding controller by intermediately determining whether each controller 160 is in the aged state and/or abnormal state and output the value of the control parameter in consideration of the abnormal state and/or abnormal state of each controller 160.

The integrated controller 100 determines whether the controller 160 is abnormal or aged based on the output of the controller state learning model (S310). This output may be the intermediate output of the controller state learning model, and in this case, the determination in step S310 may be the determination of the controller state learning model.

In step S310, when it is determined that there is no abnormality in the integrated controller 100 and/or the controller state learning model in all of the controller 160, and it is determined that there is no aging, the integrated controller 100 determines whether the vehicle driving is ended (S320).

When it is determined in step S320 that the vehicle driving has not ended, the integrated controller 100 returns to step S302 and collects the controller information or the like again.

When it is determined in step S320 that the vehicle driving has ended, the entire procedure is ended.

In step S310, when it is determined that the integrated controller 100 and/or the controller state learning model has an abnormality in at least one controller 160 or is aged, the integrated controller 100 selects the control parameter for maintaining the basic performance of the corresponding controller 160 and acquires the value of the control parameter for maintaining the basic performance. This acquisition may be obtained as the final output of the controller state learning model.

The integrated controller 100 generates the control information based on the value of the control parameter and/or the input value to be input to the corresponding controller 160 (S314).

The integrated controller 100 controls the corresponding controller 160 based on the control information (S316).

Meanwhile, the integrated controller 100 may output an alarm regarding the abnormal state or the aged state of the controller, and notify the driver or passenger of the corresponding information. Alternatively, the information on the abnormal state or aged state of the controller is transmitted to the vehicle 10 manufacturer's service center, the infrastructure 190, and/or the other vehicle 180 through the V2X communication, thereby obtaining the assistance.

After step S316, the integrated controller 100 determines whether the vehicle driving has ended (S320).

When it is determined in step S320 that the vehicle driving has not ended, the integrated controller 100 returns to step S302 and collects the controller information or the like again.

When it is determined in step S320 that the vehicle driving has ended, the entire procedure is ended.

Although it is described that each process is sequentially executed in FIG. 3, this is merely illustrative of the technical idea of an embodiment of the present disclosure. In other words, those of ordinary skill in the technical field to which an embodiment of the present disclosure belongs change the order described in FIG. 3 within a range that does not deviate from the essential characteristics of an embodiment of the present disclosure, or will be able to apply various modifications and variations to executing one or more of the respective processes in parallel, and therefore, FIG. 3 is not limited to a time-series order.

Various implementations of the devices, modules, processes, steps, etc., described herein may be realized by digital electronic circuits, integrated circuits, field programmable gate arrays (FPGAs), application specific integrated circuits (ASICs), computer hardware, firmware, software, and/or a combination thereof. These various implementations may include being implemented in one or more computer programs executable on a programmable system. The programmable system includes at least one programmable processor (which may be a special purpose processor or a general purpose processor) that receives data and commands from a storage system, at least one input device, and at least one output device and is coupled to transmit the data and commands thereto. Computer programs (also known as programs, software, software applications, or code) include instructions for a programmable processor and are stored on a "computer-readable medium".

The computer readable recording medium may include all kinds of recording apparatuses in which data that may be read by a computer system are stored. The computer-readable recording medium may further include a non-volatile or non-transitory medium such as a ROM, a CD-ROM, a magnetic tape, a floppy disk, a memory card, a hard disk, a magneto-optical disk, and a storage device, or a transitory medium such as a data transmission medium. In addition, the computer readable recording medium may be distributed in computer systems connected to each other through a network, such that the computer readable codes may be stored in a distributed scheme and executed.

Various implementations of the systems and techniques described herein may be implemented by the programmable computer. Here, the computer includes a programmable processor, a data storage system (including volatile memory, non-volatile memory, or other types of storage systems or combinations thereof) and at least one communication interface. For example, the programmable computer may be one of a server, a network device, a set-top box, an embedded device, a computer expansion module, a personal computer, a laptop, a personal data assistant (PDA), a cloud computing system, or a mobile device.

According to an aspect of the present disclosure, there is an effect that it is possible to perform compensatory control so that basic performance of a controller is maintained despite aging or abnormality of the controller by calculating a value of a control parameter for maintaining basic performance of the controller in the aging or abnormal state.

According to another aspect of the present disclosure, there is an effect that it is possible to take follow-up actions on a driver or passengers while driving of a vehicle is kept stable by performing compensatory control on a controller and providing an alarm for aging or abnormality of the controller to the driver or passengers.

According to another aspect of the present disclosure, there is an effect that it is possible to receive assistance from vehicle's driving or a vehicle controller from adjacent vehicles or adjacent infrastructure by transmitting information on aging or abnormality of the controller to the adjacent vehicles or adjacent infrastructure.

What is claimed is:

1. A vehicle integrated controller, comprising:
   an in-vehicle communication module configured to communicate with at least one controller mounted on the vehicle;
   a collection module configured to collect collection information including controller information, which is information on the at least one controller, through the in-vehicle communication module; and
   an aging abnormality processor configured to:
      calculate an aged state or an abnormal state of the at least one controller based on the collection information,
      when there exists a controller (hereinafter, "control target controller") in the aged state or abnormal state among the at least one controller, calculate a value of a control parameter for the control target controller to maintain basic performance,
      generate control information for controlling the control target controller based on the value of the control parameter,
      transmit the control information to the control target controller in preference to other data packets when it is determined that a driver's attention is reduced based on information on the driver's attention, and
      control the control target controller based on the control information.

2. The vehicle integrated controller of claim 1, wherein the aging abnormality processor includes:
   a controller state analysis module configured to calculate controller state analysis information, which is information for calculating the aged state or abnormal state of the at least one controller, from the collection information;
   a controller state learning module configured to learn the controller state analysis information to determine whether the at least one controller is in the aged state or abnormal state, and calculate the value of the control parameter based on the determination result; and
   a parameter controller configured to generate the control information for controlling the control target controller based on the value of the control parameter.

3. The vehicle integrated controller of claim 2, wherein the controller state analysis information includes all or a part of replacement time, use frequency, failure or not, information on a decrease in response speed or reaction speed, information on a decrease in a control speed or control amount of the at least one controller, whether a sensor in the at least one controller fails, and a calibration status.

4. The vehicle integrated controller of claim 2, wherein when the controller state learning module receives the controller state analysis information to determine the aged state or abnormal state of the at least one controller, and determines that the at least one controller is in the aged state or abnormal state, the controller state learning module selects the control parameter and calculates the value of the control parameter based on a previously learned controller state learning model to output the value of the control parameter.

5. The vehicle integrated controller of claim 2, wherein the parameter controller generates the control information based on the value of the control parameter and an input value for controlling the control target controller.

6. The vehicle integrated controller claim 2, wherein the parameter controller further generates alarm information for notifying the driver or passenger of the vehicle of the determination result based on the determination result.

7. The vehicle integrated controller of claim 2, wherein the parameter controller further generates assistance information for notifying infrastructure adjacent to the vehicle or other vehicles of the state of the vehicle based on the determination result and/or the value of the control parameter.

8. The vehicle integrated controller of claim 7, further comprising:
   a V2X communication module configured to transmit the assistance information to the other vehicles or the infrastructure on a route on which the vehicle drives.

9. The vehicle integrated controller of claim 1, wherein the vehicle integrated controller further includes all or a part of at least one sensor mounted on the vehicle, an input/output, and a V2X communication module communicating with other vehicles or infrastructure.

10. The vehicle integrated controller of claim 9, wherein the collection module further collects all or part of driver information, navigation information, road information, and other vehicle information from the at least one controller, the at least one sensor, and the V2X communication module as the collection information.

11. A method of controlling a vehicle integrated controller, comprising:
   collecting controller information, which is information on at least one controller, as collection information from the at least one controller mounted on a vehicle;
   calculating an aged state or an abnormal state of the at least one controller based on the collection information, and when there exists a controller (hereinafter, "control target controller") in the aged state or abnormal state among the at least one controller, calculating a value of a control parameter for the control target controller to maintain basic performance;

generating control information for controlling the control target controller based on the value of the control parameter; and control the control target controller based on the control information, wherein the calculating of the value of the control parameter includes:

receiving controller state analysis information, which is information for calculating the aged state or abnormal state of the at least one controller, to determine the aged state or abnormal state of the at least one controller based on a controller state learning model generated based on a hyperparameter for maintaining the basic performance of the control target controller, selecting the control parameter when it is determined that the at least one controller is in the aged state or abnormal state, and calculating the value of the control parameter.

12. The method of claim 11, wherein the calculating of the value of the control parameter includes:

calculating the controller state analysis information from the collection information; and determining whether the at least one controller is in the aged state or abnormal state based on the controller state analysis information, and calculating the value of the control parameter for maintaining the basic performance of the control target controller based on the determination result.

* * * * *